(12) United States Patent
Tsai et al.

(10) Patent No.: US 9,207,807 B2
(45) Date of Patent: Dec. 8, 2015

(54) VEHICULAR OPTICAL TOUCH APPARATUS

(71) Applicants: Chih-Hsien Tsai, Hsinchu (TW);
Hung-Chih Chou, Hsinchu (TW);
Wei-Szu Lin, Hsinchu (TW)

(72) Inventors: Chih-Hsien Tsai, Hsinchu (TW);
Hung-Chih Chou, Hsinchu (TW);
Wei-Szu Lin, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 251 days.

(21) Appl. No.: 13/754,870

(22) Filed: Jan. 30, 2013

(65) Prior Publication Data

US 2013/0314379 A1 Nov. 28, 2013

(30) Foreign Application Priority Data

May 25, 2012 (CN) .......................... 2012 1 0165094

(51) Int. Cl.
*G06F 3/042* (2006.01)

(52) U.S. Cl.
CPC ....................................... *G06F 3/042* (2013.01)

(58) Field of Classification Search
CPC ............................... G06F 3/042; G06F 3/0421
See application file for complete search history.

(56) References Cited

U.S. PATENT DOCUMENTS

| 8,144,271 | B2 | 3/2012 | Han | |
|---|---|---|---|---|
| 2008/0179507 | A2* | 7/2008 | Han | ............................. 250/224 |
| 2010/0302196 | A1* | 12/2010 | Han et al. | ...................... 345/173 |
| 2010/0302210 | A1* | 12/2010 | Han et al. | ...................... 345/175 |
| 2012/0257376 | A1* | 10/2012 | Zhou et al. | .................. 362/97.1 |

FOREIGN PATENT DOCUMENTS

| CN | 101821703 | 9/2010 |
|---|---|---|
| CN | 102053763 | 5/2011 |

OTHER PUBLICATIONS

"Office Action of China Counterpart Application," issued on Sep. 17, 2015, pp. 1-9.

* cited by examiner

*Primary Examiner* — Charles Hicks
*Assistant Examiner* — Brent D Castiaux
(74) *Attorney, Agent, or Firm* — Jianq Chyun IP Office (57) ABSTRACT

A vehicular optical touch apparatus includes a screen, an elastic layer, a detection light source, and an image detector. The elastic layer is disposed on the screen and includes a first surface facing away from the screen and a second surface facing the screen. The second surface includes a plurality of inclined surfaces inclined with respect to the first surface. The inclined surfaces totally reflect at least one portion of ambient light entering the elastic layer through the first surface, so that the portion of ambient light leaves the elastic layer through the first surface. The detection light source emits detection light toward the elastic layer. When an object presses the first surface to deform the second surface, the detection light sequentially passes through the elastic layer, is reflected by the object, passes through the elastic layer again, and is transmitted to the image detector.

16 Claims, 8 Drawing Sheets

VEHICULAR OPTICAL TOUCH APPARATUS

CROSS-REFERENCE TO RELATED APPLICATION

This application claims the priority benefit of China application serial no. 201210165094.9, filed on May 25, 2012. The entirety of the above-mentioned patent application is hereby incorporated by reference herein and made a part of this specification.

BACKGROUND OF THE INVENTION

1. Field of the Invention

The invention relates to a touch apparatus. More particularly, the invention relates to a vehicular optical touch apparatus.

2. Description of Related Art

As information technology, wireless mobile communication, and information home appliances have been rapidly developed and applied in recent years, input devices of a number of information products have evolved from conventional keyboards and mouse to touch panels for the purposes of convenience, miniaturization, and being user-friendly. Besides, the touch panel may be applied together with a display to form a touch panel display. Generally, touch panels may be categorized into resistive touch panels, capacitive touch panels, optical touch panels, sound wave touch panels, electromagnetic touch panels, and so on.

In the known optical touch panel, an infrared light source emits infrared light to a surface of the touch panel, and the infrared light is reflected to an image detector within the touch panel when a user's finger is in contact with the surface of the touch panel. The touch location of the finger may be determined by the infrared light detected by the image detector. Nonetheless, if the infrared light in the ambient light passes through the touch panel and travels to the image detector within the panel, the infrared light may interfere with the image detector. Particularly, given that the ambient light is rather intense (e.g., the ambient light is the sunlight), the infrared light in the ambient light may even cause the image detector to encounter the issue of overexposure. Thereby, the touch location of the finger may be barely determined according to the image detected by the image detector.

U.S. Pat. No. 8,144,271 discloses a multi-touch sensing system that includes a light guide tube, a light source, a deformation layer, and an image detector.

SUMMARY OF THE INVENTION

The invention is directed to a vehicular optical touch apparatus that may reduce the ambient light interference and ensure accurate determination of a touch location.

Other advantages of the invention can be further illustrated by the technical features broadly embodied and described as follows.

In an embodiment of the invention, a vehicular optical touch apparatus that includes a screen, an elastic layer, a detection light source, and an image detector is provided. The elastic layer is disposed on the screen and includes a first surface and a second surface. The first surface faces away from the screen. The second surface faces the screen and includes a plurality of inclined surfaces. The inclined surfaces are inclined with respect to the first surface. Every two of the inclined surfaces adjacent to each other have an average width W and a pitch P in a direction substantially parallel to the first surface, and $0.5 \leq W/P \leq 1$. The inclined surfaces totally reflect at least one portion of ambient light entering the elastic layer through the first surface, so that the at least one portion of ambient light leaves the elastic layer through the first surface. The detection light source emits detection light toward the elastic layer, and the second surface is disposed between the first surface and the image detector. When an object presses the first surface to deform the second surface, the detection light sequentially passes through the elastic layer, is reflected by the object, passes through the elastic layer again, and is transmitted to the image detector.

The optical touch apparatus described in an embodiment of the invention may have at least one of the following advantages. In the vehicular optical touch apparatus in the embodiments of the invention, the elastic layer has the inclined surfaces to totally reflect at least one portion of the ambient light entering the elastic layer through the first surface, and the portion of ambient light leaves the elastic layer through the first surface. Thereby, the amount of ambient light transmitted to the image detector may be effectively reduced. As such, the image detector may be free from the ambient light interference, and thus the vehicular optical touch apparatus may be more accurate in terms of determination of the touch location.

Other features and advantages of the invention will be further understood from the further technological features disclosed by the embodiments of the invention wherein there are shown and described embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the embodiments, reference is made to the accompanying drawings which form a part hereof, and in which are shown by way of illustration specific embodiments in which the invention may be practiced. In this regard, directional terminology, such as "top," "bottom," "front," "back," "left," "right," etc., is used with reference to the orientation of the Figure(s) being described. The components of the present invention can be positioned in a number of different orientations. As such, the directional terminology is used for purposes of illustration and is in no way limiting. From another perspective, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purposes of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
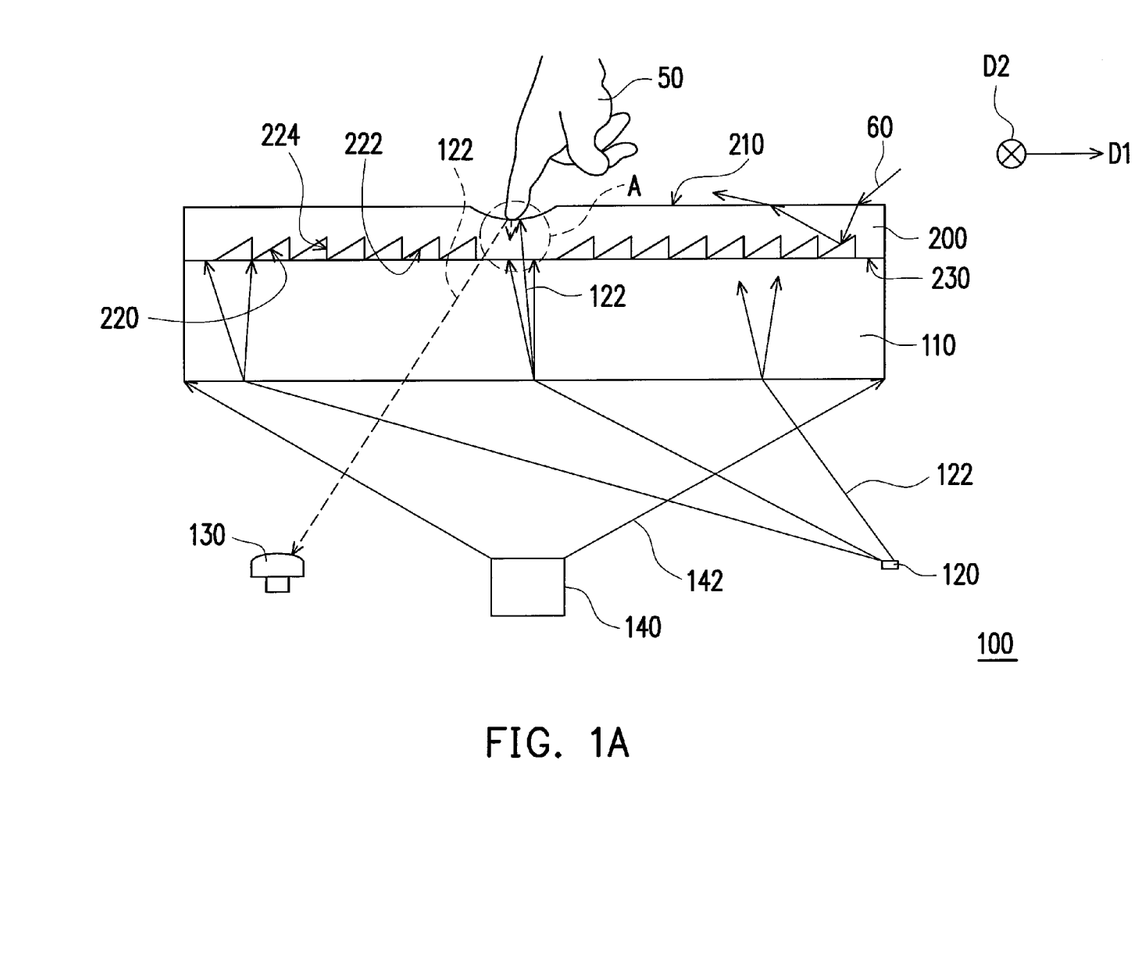
FIG. 1A is a schematic cross-sectional view illustrating a vehicular optical touch display apparatus according to an embodiment of the invention.
Figure 1B:
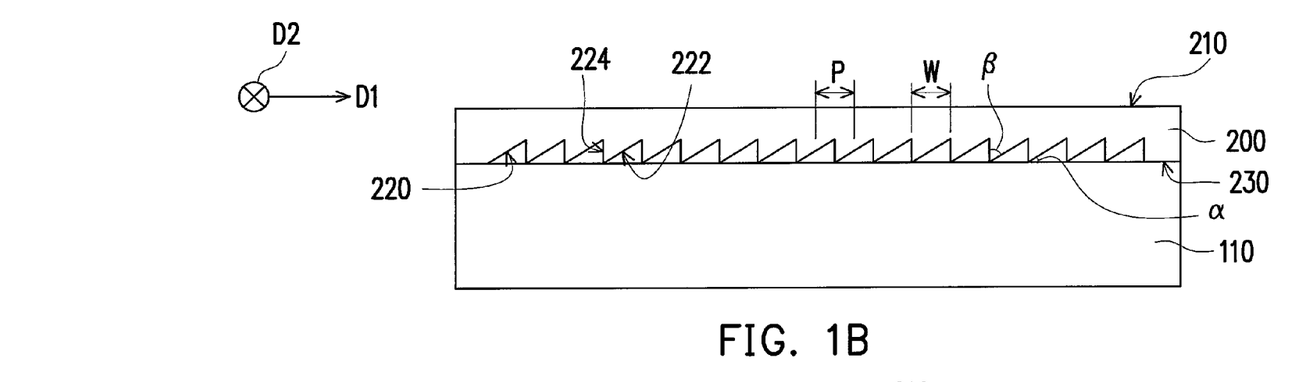
FIG. 1B shows that the elastic layer and the screen depicted in FIG. 1A are not pressed by any object.
Figure 1C:
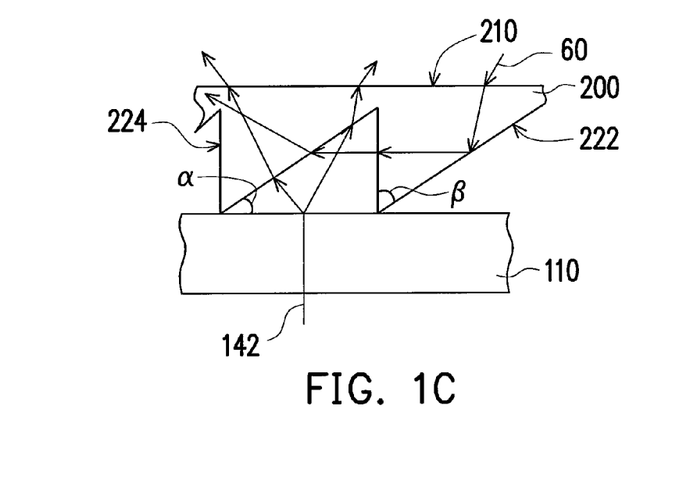
FIG. 1C is a partially enlarged view illustrating the elastic layer and the screen depicted in FIG. 1A.
Figure 1D:
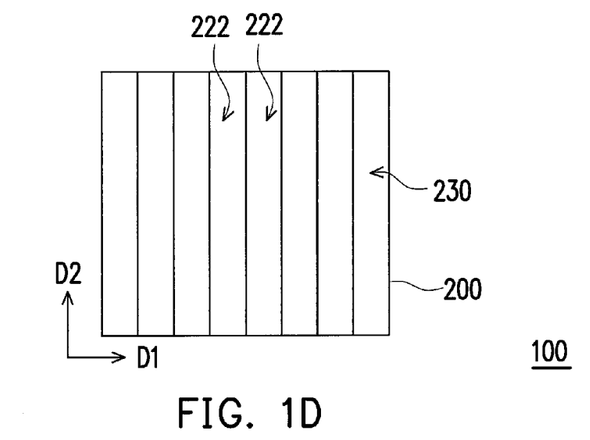
FIG. 1D is a schematic top view illustrating the vehicular optical touch apparatus depicted in FIG. 1A.

FIG. 1A is a schematic cross-sectional view illustrating a vehicular optical touch display apparatus according to an embodiment of the invention. FIG. 1B shows that the elastic layer and the screen depicted in FIG. 1A are not pressed by any object. FIG. 1C is a partially enlarged view illustrating the elastic layer and the screen depicted in FIG. 1A. FIG. 1D is a schematic top view illustrating the vehicular optical touch apparatus depicted in FIG. 1A. With reference to FIG. 1A to FIG. 1D, a vehicular optical touch apparatus 100 in this embodiment includes a screen 110, an elastic layer 200, a detection light source 120, and an image detector 130. The elastic layer 200 is disposed on the screen 110 and includes a first surface 210 and a second surface 220 opposite to the first surface 210. The first surface 210 faces away from the screen 110, and the second surface 220 faces the screen 110. In the embodiment, the screen 110 is a diffusion screen. The vehicular optical touch apparatus 100 further includes an image projection unit 140 that emits an image light beam 142, and the screen 110 is disposed on a transmission path of the image light beam 142. The image light beam 142 emitted from the image projection unit 140 is projected to and imaged on the screen 110, and the diffusion function of the diffusion screen allows the real image formed on the diffusion screen by the image projection unit 140 to be easily perceived at various viewing angles by a user.

Figure 1E:
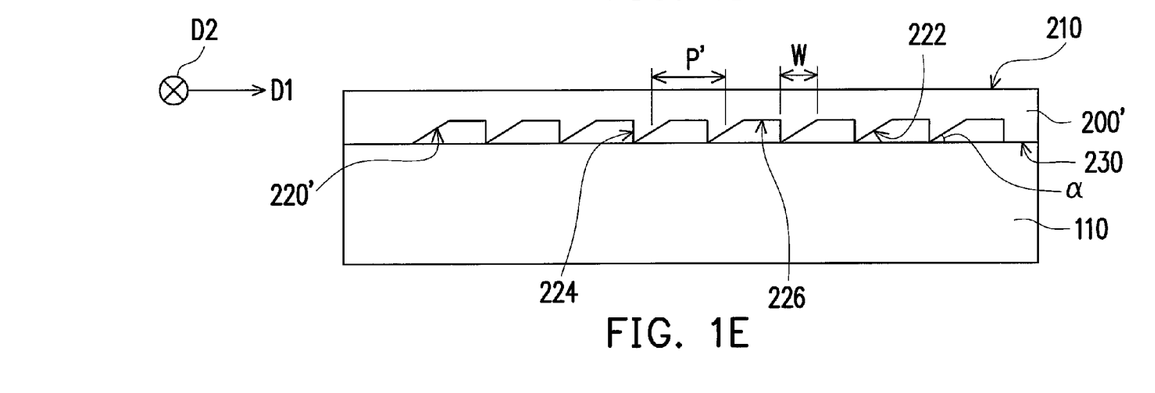
FIG. 1E shows a variation in the elastic layer depicted in FIG. 1A.

The second surface 220 includes a plurality of inclined surfaces 222. The inclined surfaces 222 are inclined with respect to the first surface 210. In the embodiment, the first surface 210 is a plane, for instance. Every two adjacent inclined surfaces 222 have an average width W and a pitch P in a direction substantially parallel to the first surface 210, and 0.5≤W/P≤1. The pitch P is defined as a distance between centers of the two adjacent inclined surfaces 222, and the ratio of W/P is exemplarily equal to 1 in FIG. 1B. However, in another embodiment of the invention, as shown in FIG. 1E, the ratio of W/P' may be equal to 0.5. Here, P' is defined as a pitch of the inclined surfaces 222 of the second surface 220' of the elastic layer 200', and the pitch P' is in a direction substantially parallel to the first surface 210. In the second surface 220', the two adjacent inclined surfaces 222 are connected to each other through a connection surface 226 and the connection surface 224, and a portion of the width of the pitch P' is attributed to the width of the connection surface 226. Hence, the pitch P' is relatively large, and the ratio of W/P' is relatively small. In other embodiments, the width of the connection surface 226 may be smaller than that shown in FIG. 1E, and the ratio of W/P may range between 0.5 and 1. According to the embodiment, the inclined surfaces 222 are arranged along a first direction D1 substantially parallel to the first surface 210, and each of the inclined surfaces 222 extends along a second direction D2 substantially parallel to the first surface 210 (as shown in FIG. 1D). In this embodiment, the first direction D1 is substantially perpendicular to the second direction D2. Besides, the average width W, the pitch P, and the pitch P' are lengths along the first direction D1, for instance.

The detection light source 120 emits detection light 122 toward the elastic layer 200, and the second surface 220 is disposed between the first surface 210 and the image detector 130. In the embodiment, the screen 110 is disposed between the elastic layer 200 and the detection light source 120, and the detection light 122 emitted from the detection light source 120 is transmitted to the elastic layer 200 after passing through the screen 110. According to the embodiment, the detection light 122 is invisible, e.g., infrared light. However, in other embodiments, the detection light 122 may also be invisible light in other wavebands or may be visible light.

The elastic layer 200 is made of an elastic material, e.g., silicone, other resin, or any other appropriate elastic material. When an object 50 (e.g., a finger, a stylus, or any other appropriate object) presses the first surface 210 to deform the second surface 220, the detection light 122 sequentially passes through the elastic layer 122, is reflected by the object 50, passes through the elastic layer 200 again, and is transmitted to the image detector 130. In particular, when the elastic layer 200 is pressed by the object 50, the pressed portion A of the first surface 210 is sunken, and thereby the inclined surfaces 222 at the pressed portion A are deformed and thus closely attached to the screen 110. Compared to the non-pressed inclined surfaces 222 that may reflect a portion of the detection light 122, the pressed inclined surfaces 222 are closely attached to the screen 110 and thus do not reflect the detection light 122 because of the deformation. As such, a relatively large amount of detection light 122 may pass through the pressed portion A of the elastic layer 200 and may then be transmitted to the object 50. The objet 50 reflects the detection light 122 back to the elastic layer 200. Similarly, compared to the non-pressed inclined surfaces 222, the pressed and deformed inclined surfaces 222 are closely attached to the screen 110 and thus do not reflect the detection light 122, and accordingly the detection light 122 may be transmitted to the image detector 130. The vehicular optical touch apparatus 100 may then determine the location of the object 50 relative to the screen based on the location of the image generated by the detection light 122 that comes from the pressed portion A and is detected by the image detector 130, so that the vehicular optical touch apparatus 100 may determine the touch location. The image detector 130 is a charge coupled device (CCD), a complementary metal oxide semiconductor (CMOS) sensor, or any other appropriate image sensor, for example.

In the embodiment, the second surface 220 further includes a plurality of connection surfaces 224, each of which connects two adjacent inclined surfaces 222. Additionally, the connection surfaces 224 are substantially perpendicular to the first surface 210 in the embodiment. The inclined surfaces 222 totally reflect at least one portion of ambient light 60 entering the elastic layer 200 through the first surface 210, such that the at least one portion of ambient light 60 leaves the elastic layer 200 through the first surface 210. For instance, as shown in FIG. 1A, when the ambient light 60 enters the elastic layer 200 through the first surface 210 and travels to the inclined surfaces 222, and if the light-incident angle of the ambient light 60 striking the inclined surfaces 222 is greater than a critical angle, the inclined surfaces 222 totally reflect the ambient light 60, for example, to the first surface 210, and the ambient light 60 leaves the elastic layer 200 through the first surface 210. Thereby, the ambient light 60 is not transmitted to the image detector 130 and thus does not impair the accuracy of the image detector 130 in terms of detecting the detection light 122. In the embodiment, the infrared light in the ambient light 60 is not transmitted to the image detector 130 and thus does not interfere with the image detector 130. Alternatively, as illustrated in FIG. 1C, another portion of ambient light 60 may be reflected to the connection surfaces 224 after being totally reflected by the inclined surfaces 222. The ambient light 60 then sequentially passes through the connection surface 224, is refracted by another inclined surface 222 adjacent to the connection surface 224 to the first surface 210, and leaves the elastic layer 200 through the first surface 210. Thereby, the ambient light 60 is less likely to be transmitted to the image detector 130. Moreover, the ambient light, after being totally reflected by the inclined surfaces 222, may pass through the plurality of connection surfaces 224 and the adjacent plurality of inclined surfaces 222. After the ambient light 222 is refracted by the connection surfaces 224 and the inclined surfaces 222, the ambient light 60 may be transmitted back to the first surface 210 and may then leave the elastic layer 200 through the first surface 210, which also ensures that the ambient light 60 is less likely to be transmitted to the image detector 130.

In the vehicular optical touch apparatus 100 described in the embodiment, the elastic layer 200 has the inclined surfaces 222 to totally reflect at least one portion of the ambient light 60 entering the elastic layer 200 through the first surface 210, and the portion of ambient light 60 leaves the elastic layer 200 through the first surface 210. Thereby, the amount of ambient light 60 transmitted to the image detector 130 may be effectively reduced. As such, the image detector 130 may be free from the interference of the ambient light 60, and thus the vehicular optical touch apparatus 100 may be more accurate in terms of determination of the touch location. Since the vehicular optical touch apparatus 100 described in the embodiment may effectively reduce the amount of ambient light 60 transmitted to the image detector 130, the optical touch apparatus 100 may function properly even in case of the intense ambient light 60 (e.g., the sunlight) and may accurately determine the touch location of the object 50. When the elastic layer 200 of the optical touch apparatus 100 described in the embodiment satisfies 0.5≤W/P≤1, the amount of ambient light 60 transmitted to the image detector 130 may be effectively reduced, and thereby the optical touch apparatus 100 may be free from the interference of the ambient light 60.

Besides, when the image light beam 142 is scattered by the screen 110 and transmitted to the inclined surfaces 222, the image light beam 142 enters a dense medium (the material of the elastic layer 200, e.g., silicone) from a less dense medium (e.g., air), and therefore no total reflection occurs. Hence, the image light beam 142 passes through the elastic layer 200 and is perceivable to a user. Even though the elastic layer 200 is disposed in front of the screen 110, a user is able to watch the display frame on the screen 110.

As shown in FIG. 1C, in the embodiment, an included angle α between the inclined surface 222 and the screen 110 is 45 degrees, for instance, and an included angle β between the inclined surface 222 and the connection surface 224 is 45 degrees, for instance, which should not be construed as limitations to the invention. The values of the included angles α and β may be adjusted based on the actual light-incident direction of the ambient light 60.

In the embodiment, the second surface 220 further includes bonding surfaces 230 that are disposed at two opposite sides of the inclined surfaces 222, and the elastic layer 200 may be bonded to the screen 110 through the bonding surfaces 230 (e.g., using an adhesive to adhere the bonding surfaces 230 to the screen 110).

Figure 1F:
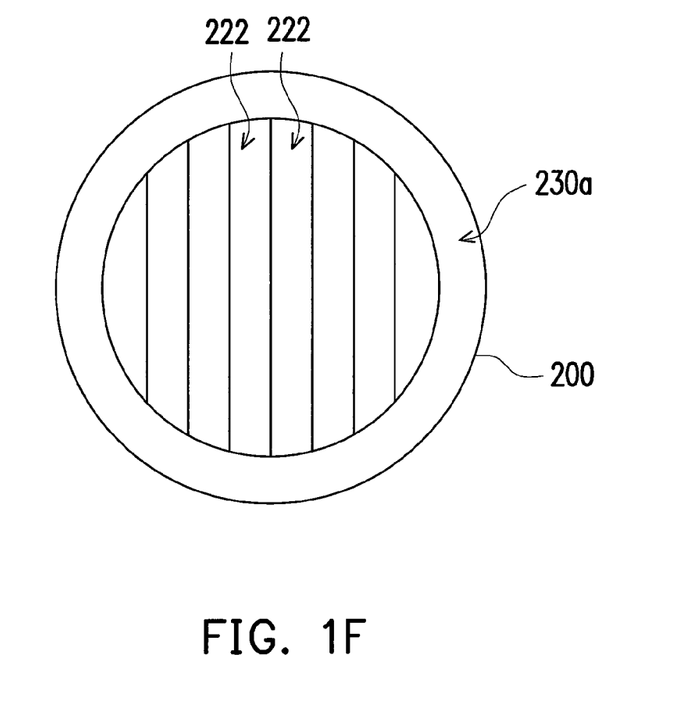
FIG. 1F shows a variation in the vehicular optical touch apparatus depicted in FIG. 1A.

With reference to FIG. 1D, in the embodiment, the top view of the vehicular optical touch apparatus 100 is shaped as a rectangle, i.e., the screen 110 is a normal rectangular screen. However, in another embodiment as shown in FIG. 1F, the top view of the vehicular optical touch apparatus 100a may be shaped as a circle, and the bonding surface 230a of the vehicular optical touch apparatus 100a may surround the inclined surfaces 222. The top view of the vehicular optical touch apparatus 100 may also be shaped as other geometric figures or may be shaped irregularly.

Figure 2:
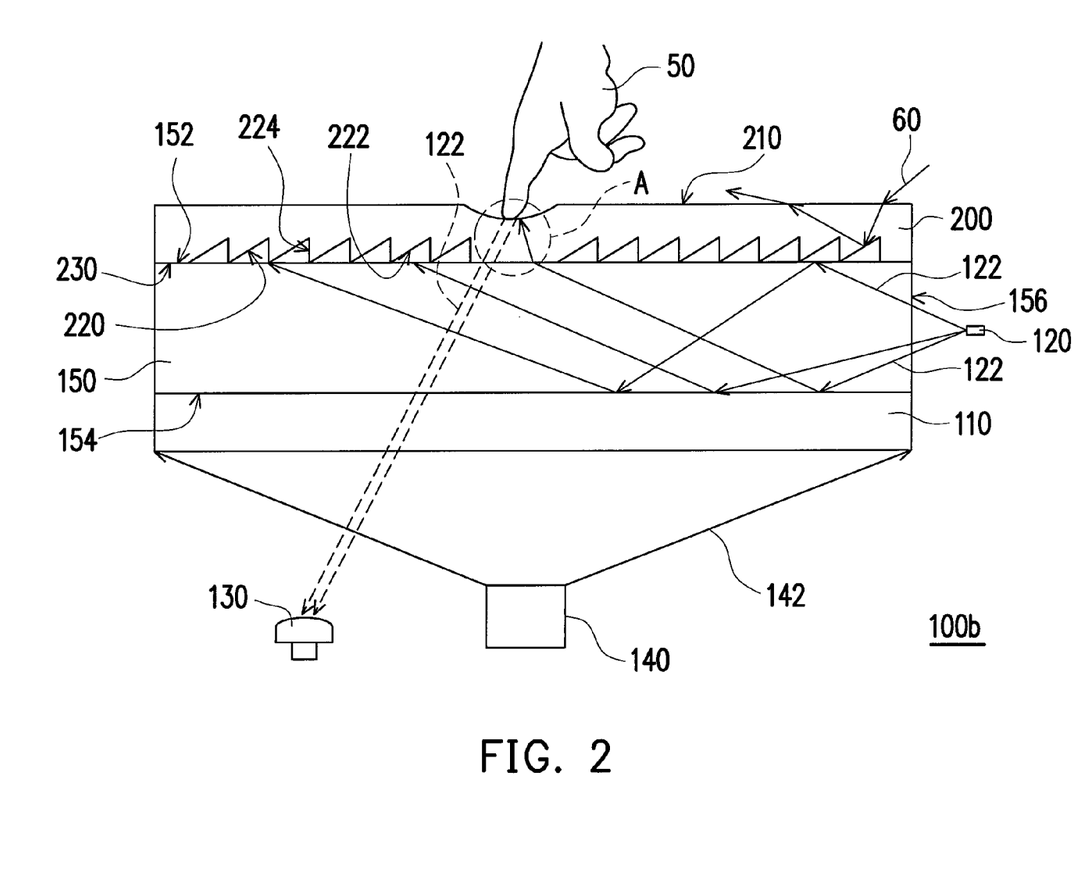
FIG. 2 is a schematic cross-sectional view illustrating a vehicular optical touch display apparatus according to another embodiment of the invention.

FIG. 2 is a schematic cross-sectional view illustrating a vehicular optical touch display apparatus according to another embodiment of the invention. With reference to FIG. 2, the vehicular optical touch apparatus 100b of the embodiment is similar to the vehicular optical touch apparatus 100 depicted in FIG. 1A, and the difference therebetween is described below. In the embodiment, the vehicular optical touch apparatus 100b further includes a light guide unit 150 disposed between the screen 110 and the elastic layer 200. The light guide unit 150 has a third surface 152 facing the elastic layer 200, a fourth surface 154 facing the screen 110, and a light-incident surface 156 connecting the third surface 152 and the fourth surface 154. In the embodiment, the light guide unit 150 is disposed on the screen 110, and the elastic layer 200 is disposed on the third surface 152. For instance, the elastic layer 200 may be bonded to the third surface 152 through the bonding surface 230. The detection light source 120 is disposed beside the light-incident surface 156, and the detection light 122 enters the light guide unit 150 through the light-incident surface 156. Since the contact area between the third surface 152 and an intersection tip of the inclined surface 222 and the connection surface 224 is limited, gaps (e.g., air gaps) exist between the light guide unit 150 and a great portion of the elastic layer 200. Accordingly, after the detection light 122 enters the light guide unit 150 through the light-incident surface 156, most of the detection light 122 is unceasingly totally reflected by the third surface 152 and the fourth surface 154 and is restrained within the light guide unit 150.

When the first surface 210 is pressed by the object 50, the inclined surfaces 222 at the pressed portion A are deformed in a direction facing the third surface 152 and are thus closely attached to the third surface 152, such that the detection light 122 in the light guide unit 150 is released from the portion (i.e., the pressed portion A) of the inclined surfaces 222 closely attached to the third surface 152 and is then transmitted to the object 50 through the elastic layer 200. Specifically, when the inclined surfaces 222 are closely attached to the third surface 152, the air gaps between the inclined surfaces 222 and the third surface 152 do not exist. Thereby, the total reflection of the detection light 122 by the third surface 152 is impaired, and the detection light 122 at the pressed portion A passes through the third surface 152 and the elastic layer 200 and is then transmitted to the object 50. The object 50 then reflects the detection light 122, such that the detection light 122 sequentially passes through the elastic layer 200, the light guide unit 150, and the screen 110 and is then transmitted to the image detector 130. As such, the image detector 130 is able to detect the detection light 122 transmitted from the pressed portion A, and the optical touch apparatus 100b may then be able to determine the location of the pressed portion A.

In the embodiment, the inclined surfaces 222 may also totally reflect at least one portion of the ambient light 60 to prevent the ambient light 60 from transmitting to the image detector 130, which has already been elaborated in the previous embodiments and thus will not be described hereinafter.

Figure 3:
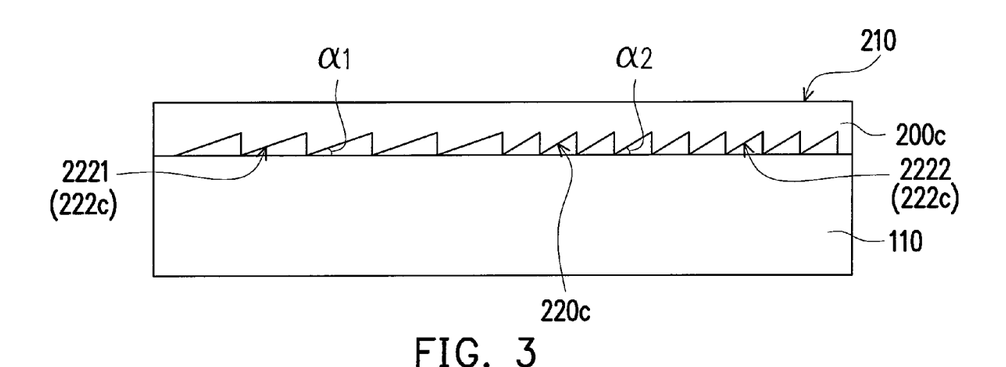
FIG. 3 is a schematic cross-sectional view illustrating a screen and an elastic layer according to another embodiment of the invention.

FIG. 3 is a schematic cross-sectional view illustrating a screen and an elastic layer according to another embodiment of the invention. With reference to FIG. 3, the optical touch apparatus of the embodiment is similar to the optical touch apparatus 100 depicted in FIG. 1A, and the difference therebetween is described below. In the optical touch apparatus described in the embodiment, the inclined surfaces 222c of the elastic layer 200c include a plurality of sets of inclined surfaces (e.g., inclined surfaces 2221 and 2222) with different slopes. The sets of inclined surfaces 222c with the different slopes are respectively located at different regions on the second surface 220c. For instance, as shown in FIG. 3, the inclined surfaces 2221 with the relatively small slope are located at the left side of the second surface 220c, while the inclined surfaces 2222 with the relatively large slope are located at the right side of the second surface 220c. From another perspective, an included angle 1 between the inclined surface 2221 and the screen 110 is smaller than an included angle $\alpha 2$ between the inclined surface 2222 and the screen 110. Here, the included angle $\alpha 1$ is 30 degrees, for instance, and the included angle $\alpha 2$ is 45 degrees, for instance, which should not be construed as limitations to the invention. The elastic layer 200c in this embodiment has the inclined surfaces 222c with different slopes in different regions; therefore, when the ambient light 60 irradiates different regions of the elastic layer 200c and forms different light-incident angles, the different slopes of the inclined surfaces 222c may be properly designed to have different values based on the ambient light 60 with different light-incident angles. As such, the elastic layer 200c is capable of totally reflecting a relatively large portion of the ambient light 60. In FIG. 3, two different slopes are shown, while three or more different slopes may be applicable in other embodiments.

Figure 4:
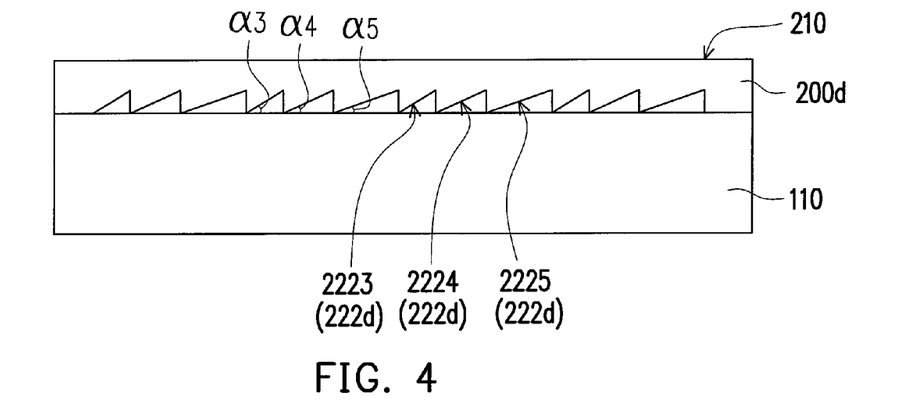
FIG. 4 is a schematic cross-sectional view illustrating a screen and an elastic layer according to another embodiment of the invention.

FIG. 4 is a schematic cross-sectional view illustrating a screen and an elastic layer according to another embodiment of the invention. With reference to FIG. 4, the elastic layer 200d described in the embodiment is similar to the elastic layer 200c depicted in FIG. 3, while the difference therebetween is described below. In the optical touch apparatus described in the embodiment, the sets of the inclined surfaces 222d (e.g., inclined surfaces 2223, 2224, and 2225) of the elastic layer 200d with different slopes are arranged alternately. For instance, the inclined surfaces 2223, 2224, and 2225 are sequentially and repeatedly arranged in a direction substantially parallel to the first surface 210. When the sets of inclined surfaces 222d with different slopes are alternately arranged, the inclined surfaces 222d as a whole are applicable to the incident ambient light 60 from different directions, so as to expand the applicability of the optical touch apparatus in consideration of different kinds of ambient light. Since the inclined surfaces 2223, 2224, and 2225 have different slopes, the width of the inclined surfaces 2223, 2224, and 2225 may be different from one another. At this time, the ratio of the average width to the pitch of any two of the adjacent inclined surfaces 2223, 2224, and 2225 still ranges from 0.5 to 1. For instance, the average width of the adjacent inclined surfaces 2223 and 2224 is [(the width of the inclined surface 2223)+ (the width of the inclined surface 2224)]/2, and the pitch between the inclined surfaces 2223 and 2224 is the distance from the center of the inclined surface 2223 to the center of the inclined surface 2224 in a direction substantially parallel to the first surface 210. According to the embodiment, an included angle $\alpha 3$ between the inclined surface 2223 and the screen 110 is 60 degrees, for instance, an included angle $\alpha 4$ between the inclined surface 2224 and the screen 110 is 40 degrees, for instance, and an included angle $\alpha 5$ between the inclined surface 2225 and the screen 110 is 20 degrees, for instance, which should not be construed as limitations to the invention. Besides, in other embodiments of the invention, the arrangement order of the inclined surfaces 2223, 2224, and 2225 may be different from that shown in FIG. 4. Alternatively, the inclined surfaces 2223, 2224, and 2225 may be arranged in a random manner.

Figure 5:
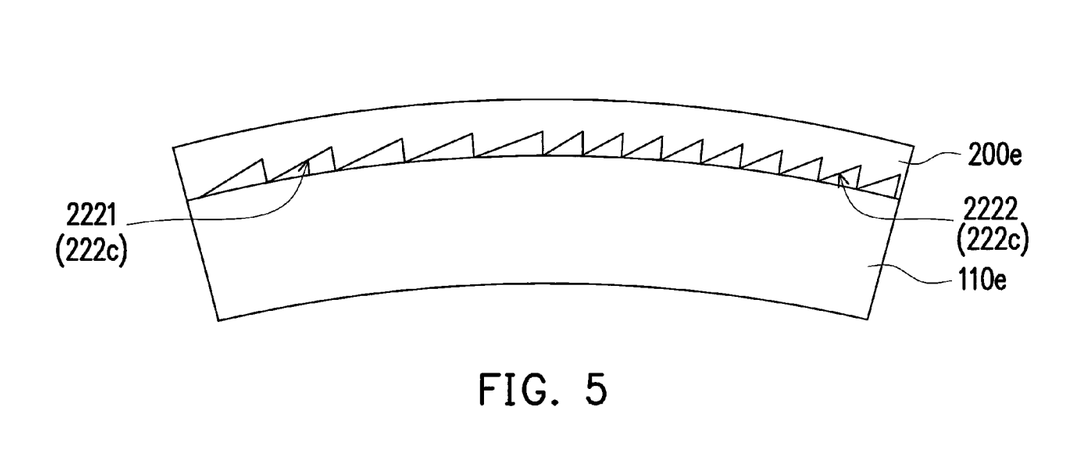
FIG. 5 is a schematic cross-sectional view illustrating a screen and an elastic layer according to another embodiment of the invention.

FIG. 5 is a schematic cross-sectional view illustrating a screen and an elastic layer according to another embodiment of the invention. With reference to FIG. 5, the screen 110e and the elastic layer 200e described in the embodiment are similar to the screen 110 and the elastic layer 200c depicted in FIG. 3, while the difference therebetween is described below. In the embodiment shown in FIG. 3, the screen 110 is a flat screen, and the elastic layer 200c is a flat layer. However, in the embodiment, the screen 110e is a curved screen, and the elastic layer 200e is a curved layer. At this time, the image projection unit 140 (shown in FIG. 1A) may project a curved image onto the screen 110e, and the image is curved in compliance with the curvature of the screen 110e. In addition, the elastic layer 200e is curved, and thus different light-incident angles may be formed even though parallel ambient light enters the elastic layer 200e. According to the embodiment, the inclined surfaces 2221 and 2222 have different slopes, such that the total reflection effect is well accomplished even though the ambient light has different light-incident angles.

Figure 6:
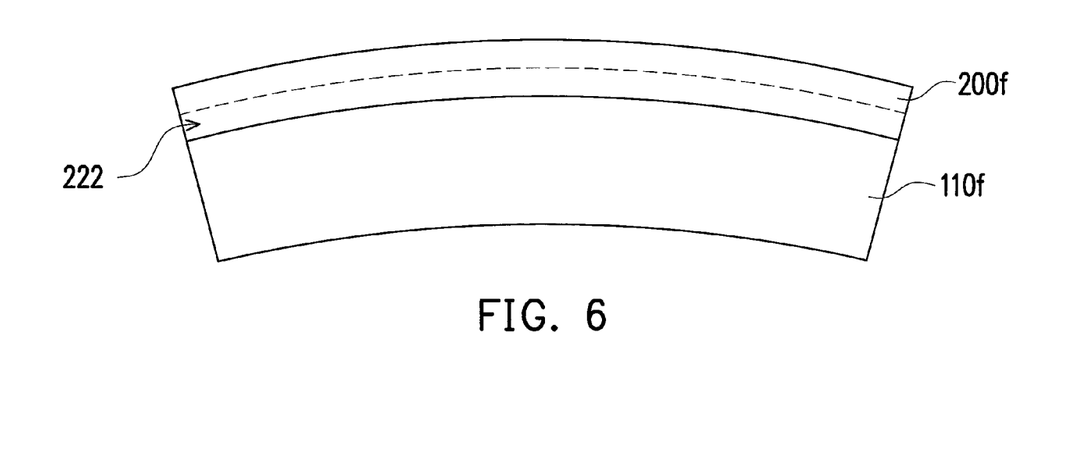
FIG. 6 is a schematic cross-sectional view illustrating a screen and an elastic layer according to another embodiment of the invention.

FIG. 6 is a schematic cross-sectional view illustrating a screen and an elastic layer according to another embodiment of the invention. With reference to FIG. 6, the screen 110f and the elastic layer 200f described in the embodiment are similar to the screen 110 and the elastic layer 200 depicted in FIG. 1A, while the difference therebetween is described below. In the embodiment, the screen 110f is a curved screen, and the elastic layer 200f is a curved layer. In FIG. 5, the elastic layer 200e is curved in an arrangement direction of the inclined surfaces 222c, while the elastic layer 200f in FIG. 6 is curved in an extension direction of the inclined surfaces 222. However, in other embodiments, the elastic layer may be curved in a direction which is neither the extension direction of the inclined surfaces nor the arrangement direction of the inclined surfaces.

Figure 7:
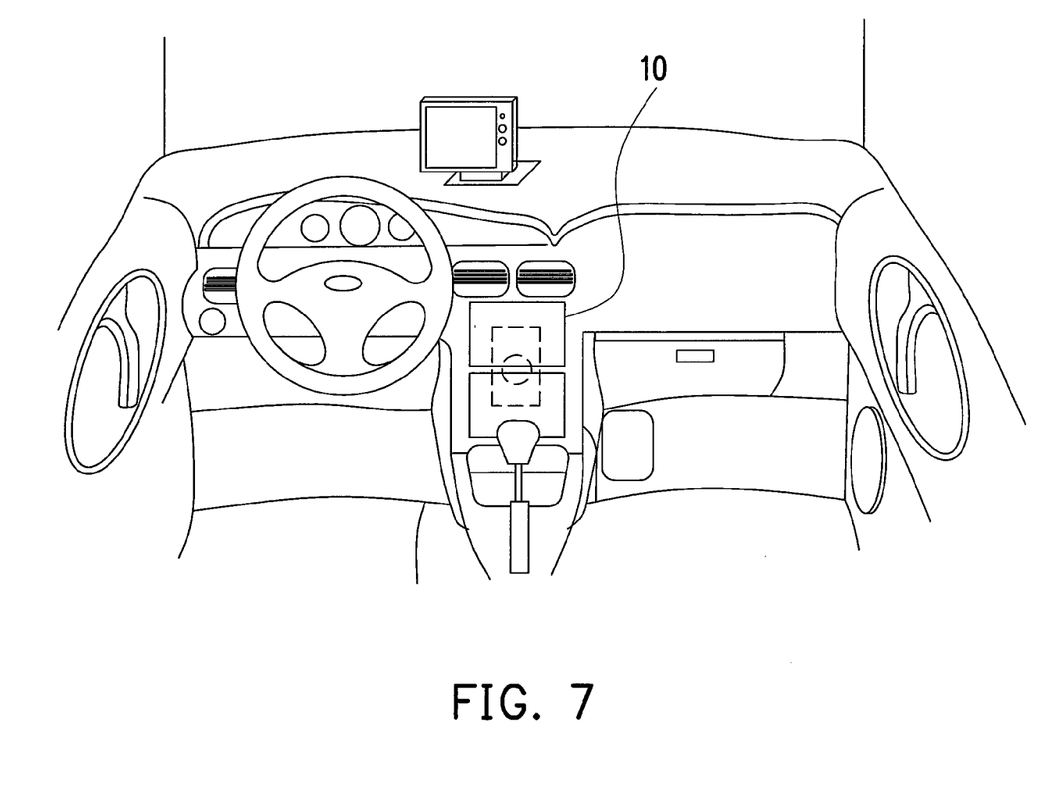
FIG. 7 is a schematic view illustrating that a vehicular optical touch display apparatus is applied in a vehicle cabin according to an embodiment of the invention.

In addition, the elastic layer 200' in FIG. 1E, the elastic layer 200c in FIG. 3, the elastic layer 200d in FIG. 4, the elastic layer 200e and the screen 110e in FIG. 5, and the elastic layer 200f and the screen 110f in FIG. 6 are all applicable in the embodiment (wherein the vehicular optical touch apparatus has the light guide unit 150) shown in FIG. 2. When the elastic layer 200e and the screen 110e are applied in the embodiment (wherein the vehicular optical touch apparatus has the light guide unit 150) shown in FIG. 2, or when the elastic layer 200f and the screen 110f are applied in the embodiment (wherein the vehicular optical touch apparatus has the light guide unit 150) shown in FIG. 2, the light guide unit 150 may be a light guide plate that is curved together with the screen 110e or the screen 110f. FIG. 7 is a schematic view illustrating that a vehicular optical touch display apparatus is applied in a vehicle cabin according to an embodiment of the invention.

To sum up, the vehicular optical touch apparatus described in an embodiment of the invention may have at least one of the following advantages. In the vehicular optical touch apparatus according to the embodiments of the invention, the elastic layer has the inclined surfaces to totally reflect at least one portion of the ambient light entering the elastic layer through the first surface, and the portion of ambient light leaves the elastic layer through the first surface. Thereby, the amount of ambient light transmitted to the image detector may be effectively reduced. As such, the image detector may be free from the ambient light interference, and thus the optical touch apparatus may be more accurate in terms of determination of the touch location.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A vehicular optical touch apparatus comprising:
   a screen;
   an elastic layer disposed on the screen, the elastic layer comprising:
      a first surface facing away from the screen; and
      a second surface facing the screen and comprising a plurality of inclined surfaces, the inclined surface being inclined with respect to the first surface, every two of the inclined surfaces adjacent to each other having an average width and a pitch in a direction substantially parallel to the first surface, the average width being defined as W, the pitch being defined as P, $0.5 \leq W/P \leq 1$, wherein the inclined surface totally reflect at least one portion of ambient light entering the elastic layer through the first surface, such that the at least one portion of ambient light leaves the elastic layer through the first surface;
   a detection light source emitting detection light toward the elastic layer; and
   an image detector, the second surface being disposed between the first surface and the image detector, wherein when an object presses the first surface to deform the second surface, the detection light sequentially passes through the elastic layer, is reflected by the object, passes through the elastic layer again, and is transmitted to the image detector.

2. The vehicular optical touch apparatus as recited in claim 1, wherein the screen is disposed between the elastic layer and the detection light source.

3. The vehicular optical touch apparatus as recited in claim 1, further comprising a light guide unit disposed between the screen and the elastic layer, the light guide unit having a third surface facing the elastic layer, a fourth layer facing the screen, and a light-incident surface connecting the third surface and the fourth surface, wherein the detection light source is disposed beside the light-incident surface, the detection light enters the light guide unit through the light-incident surface, and when the object presses the first surface, the inclined surfaces at a pressed portion of the first surface are deformed in a direction facing the third surface and are closely attached to the third surface, such that the detection light in the light guide unit is released from a portion of the inclined surfaces closely attached to the third surface and transmitted to the object through the elastic layer.

4. The vehicular optical touch apparatus as recited in claim 1, wherein the inclined surfaces comprise a plurality of sets of inclined surfaces with different slopes.

5. The vehicular optical touch apparatus as recited in claim 4, wherein the sets of inclined surfaces with the different slopes are respectively located at different regions on the second surface.

6. The vehicular optical touch apparatus as recited in claim 4, wherein the sets of inclined surfaces with the different slopes are alternately arranged.

7. The vehicular optical touch apparatus as recited in claim 1, wherein the first surface is a plane.

8. The vehicular optical touch apparatus as recited in claim 1, wherein the screen is a diffusion screen.

9. The vehicular optical touch apparatus as recited in claim 8, further comprising an image projection unit emitting an image light beam, wherein the diffusion screen is disposed on a transmission path of the image light beam.

10. The vehicular optical touch apparatus as recited in claim 1, wherein the screen is a curved screen, and the elastic layer is a curved layer.

11. The vehicular optical touch apparatus as recited in claim 1, wherein the screen is a flat screen, and the elastic layer is a flat layer.

12. The vehicular optical touch apparatus as recited in claim 1, wherein the second surface further comprises a plurality of connection surfaces, and each of the connection surfaces connects to two of the inclined surfaces adjacent to each other.

13. The vehicular optical touch apparatus as recited in claim 12, wherein the connection surfaces are substantially perpendicular to the first surface.

14. The vehicular optical touch apparatus as recited in claim 1, wherein the detection light is invisible to humans, and the image detector is configured to detect the detection light.

15. The vehicular optical touch apparatus as recited in claim 1, wherein the inclined surfaces are arranged along a first direction substantially parallel to the first surface, and each of the inclined surfaces extends along a second direction substantially parallel to the first surface.

16. The vehicular optical touch apparatus as recited in claim 15, wherein the first direction is substantially perpendicular to the second direction.

* * * * *